United States Patent [19]

Kugler et al.

[11] 3,721,125

[45] March 20, 1973

[54] THERMAL ACTUATOR FOR A METER TEMPERATURE COMPENSATING MECHANISM

[75] Inventors: Carl J. Kugler, Philadelphia, Norman Porter, Sellersville, both of Pa.

[73] Assignee: The Singer Company, New York, N.Y.

[22] Filed: June 23, 1971

[21] Appl. No.: 155,952

[52] U.S. Cl. ................................73/368.3, 73/233
[51] Int. Cl. ............................G01k 5/32, G01f 3/20
[58] Field of Search .....73/362.4, 368.3, 233; 74/190

[56] References Cited

UNITED STATES PATENTS

| | | | |
|---|---|---|---|
| 2,120,929 | 6/1938 | Clifford | 73/362.4 |
| 2,208,687 | 7/1940 | Renfrew | 73/233 |

FOREIGN PATENTS OR APPLICATIONS

| | | | |
|---|---|---|---|
| 80,575 | 2/1956 | Denmark | 73/362.4 |

Primary Examiner—Louis R. Prince
Assistant Examiner—Daniel M. Yasich
Attorney—Marshall J. Breen et al.

[57] ABSTRACT

A thermal actuator for a meter temperature compensating mechanism which includes a casing mounted in the meter housing within a temperature well so as to be exposed to the mainstream of throughput flow of the meter. The casing has a hermetically sealed chamber at its lower end filled with a thermally expansible liquid. A bellows enclosed the top of the chamber and extends downwardly therein. An actuator rod is mounted between the bellows and a temperature compensating mechanism in a friction-free manner by the opposite ends thereof, making point contact respectively with the bellows and said mechanism. The thermal actuator signals changes in the density of the throughput flow of the meter caused by variations in the fluid temperature. The actuator rod will move friction-free upwardly or downwardly in direct proportion to the temperature change, to thus cause a corresponding shift in said mechanism to compensate for the changing volume in the throughput flow.

5 Claims, 6 Drawing Figures

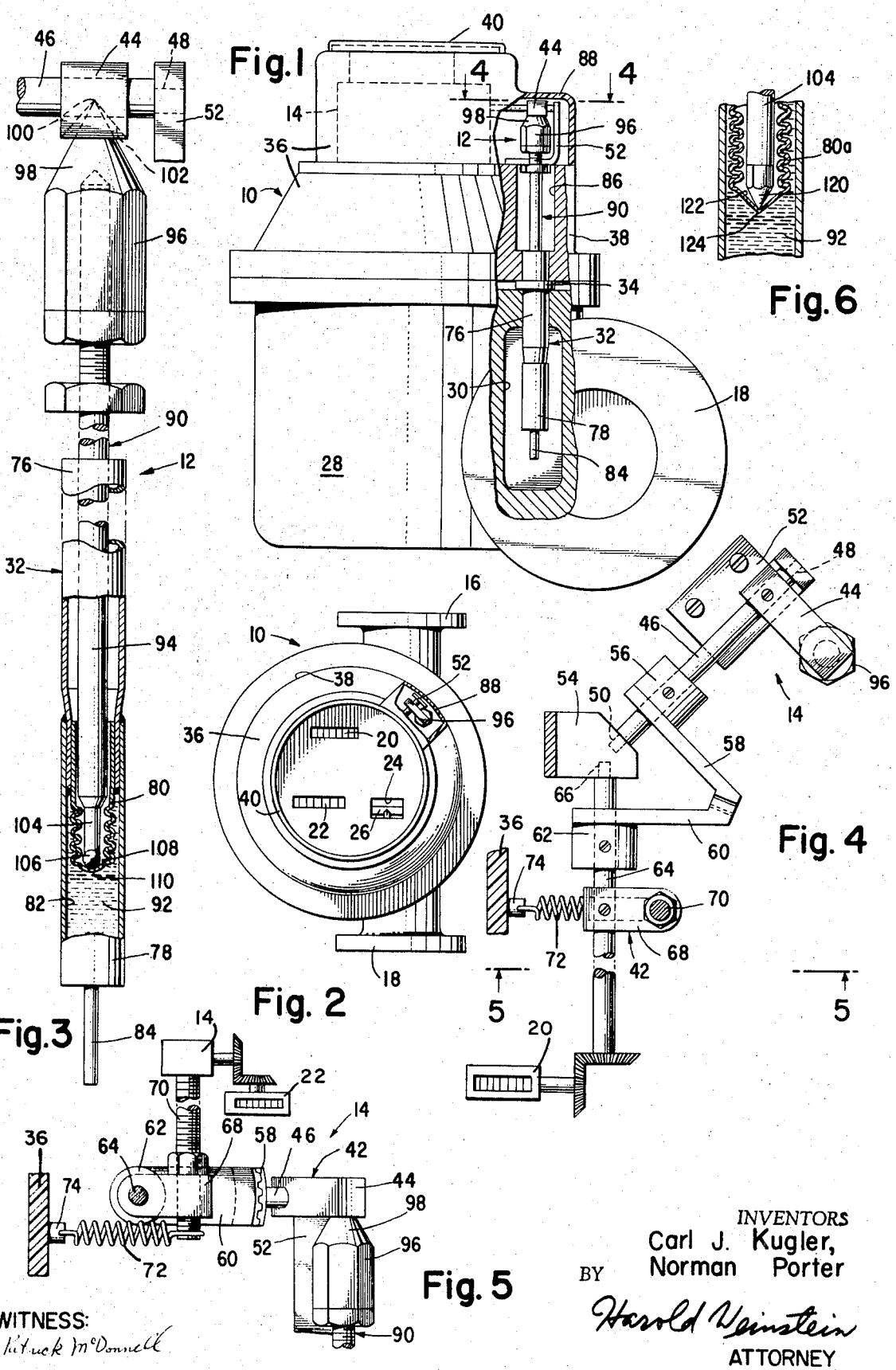

THERMAL ACTUATOR FOR A METER TEMPERATURE COMPENSATING MECHANISM

BACKGROUND OF THE INVENTION

Thermal actuators in the prior art have been expensive, complex or inaccurate. The bimetallic thermal actuator is weak and inaccurate. Existing liquid filled thermal actuators are affected by ambient temperatures and require fixed or pivoted mechanical connections, which again lead to system inaccuracy.

SUMMARY OF THE INVENTION

It is therefore an object of the present invention to provide a novel thermal actuator which overcomes the prior art disadvantages; which is simple, economical, reliable and accurate; which uses a mounting system for the actuator arm which is friction-free; which is not affected by ambient temperatures; which uses an actuator rod making point contact at its opposite ends with a bellows and a biased member of the temperature compensating mechanism; and, which uses an actuator rod having a ball or cone-shaped end for seating in a corresponding ball or cone-shaped socket of the mounting members for point contact therewith.

Other objects and advantages will be apparent from the following description of several embodiments of the invention, and the novel features will be particularly pointed out hereinafter in the claims.

BRIEF DESCRIPTION OF THE DRAWINGS

This invention is illustrated in the accompanying drawings in which:

FIG. 1 is an elevational view, partly in section, of a meter in which the present invention is embodied;

FIG. 2 is a top plan view, partly broken away, of the meter of FIG. 1;

FIG. 3 is an enlarged elevational view, partly broken away, of the improved thermal actuator of the present invention;

FIG. 4 is a view taken along lines 4—4 of FIG. 1, showing a portion of the temperature compensating mechanism which biases the actuator rod of the thermal actuator, and in turn, is operatively affected thereby;

FIG. 5 is a view taken along lines 5—5 of FIG. 4, showing an elevational view of the temperature compensating mechanism;

FIG. 6 is an elevational view, partly in section, of the bellows and of the thermal actuator showing a modified embodiment thereof.

DESCRIPTION OF THE INVENTION

In the preferred embodiment of the invention illustrated in FIGS. 1 and 2, a conventional positive displacement meter 10 is provided with the novel thermal actuator designated generally as 12 and operatively connected to a temperature compensating mechanism 14. The temperature compensating mechanism 14 can be the type shown in U.S. Pat. No. 2,889,713, modified as necessary to perform the operative functions of the present assembly. For example, the thermal actuator 12 of the present invention could be used in place of the Bourdon spirals and associated sensors shown in U.S. Pat. No. 2,889,713.

The meter 10 illustrated in FIGS. 1 and 2 can be a rotary meter, a turbine meter, or other type meter used for measuring the amount of fluid, such as a gas, flowing into the meter 10 to inlet 16 to be discharged from outlet 18. The uncorrected volume of gas flowing through the meter 10 is shown in FIG. 2 by the register 20. The temperature compensating mechanism 14 makes a continuous compensation for changes in temperature occurring during the measurement of the volume of the gas by the meter 10, and the corrected volume of the gas is indicated in the register 22. The temperature of the gas flowing through the meter 10 is indicated in the window 24 by a dial and indicator 26 which is positioned responsive to the temperature compensating mechanism 14, as signaled by the thermal actuator 12, as is known in the art.

The meter 10 has a cylindrical portion 28 having a chamber means 30 formed therein, a portion of which is shown in FIG. 1 in communication with the inlet and outlet, and wherein a suitable impeller or rotatable means (not shown) is driven by the gas throughput flow. A casing 32 having a mounting flange 34, is inserted into the chamber 30 in the preferred embodiment adjacent the inlet 16, so as to be exposed to the mainstream of the through-put flow of the gas. Alternately, the casing 32 can be mounted adjacent the outlet 18. The mounting flange 34 is trapped between the connecting flanges of the end bell 36 and the cylindrical portion 28 of the meter housing 38. A cover 40 encloses the upper end of the end bell and is connected thereto by suitable securing means.

Only a portion of the temperature compensating mechanism 14 has been shown, mainly in FIGS. 4 and 5, and that portion relates to the actuator linkage assembly 42 thereof. The actuator linkage assembly 42 serves the dual function of biasing the thermal actuator 12 into operative position and of signaling the temperature changes responsive to the positioning of the thermal actuator 12 to said mechanism 14 to be compensated for in the volume measurement as reflected in corrected counter 22. The linear motion of the thermal actuator 12 is transmitted to one end of a biasing plate or arm 44, the other end of which is fixedly connected to a shaft 46, horizontally mounted in spaced bearings 48 and 50. The bearing 48 is formed at one end of a bearing bracket 52, and the bearing 50 is formed at one end of a bearing block 54. The hub 56 of a bevelled miter gear 58 is fixedly connected to the shaft 46, adjacent the bearing block 54. Bevelled miter gear 60 mates with gear 58 and has a hub 62 fixedly connected to horizontal shaft 64. The shaft 64 is mounted in bearings with only the bearing 66 formed in a bearing block 54 being shown in FIG. 4. A bracket arm 68 is fixedly connected to the shaft 64 and lies in the same plane as the biasing arm 44. A vertical shaft 70 is threadedly connected to the cantilevered end of the bracket arm 68 to lie on the same side of shaft 64 as does the thermal actuator 12. The lower end of the shaft 70 extends below the bracket arm 68, and has one end of a spring 72 connected thereto. The spring 72 has its other end staked as at 74 into a wall of the end bell 36, as illustrated in FIGS. 4 and 5. The spring 72 extends transversely below the shaft 64 and biases the vertical shaft 70 to pivot clockwise about the axis of shaft 64, as shown in FIG. 5, and through the connecting gears 58 and 60, likewise biases the arm 44 to pivot clockwise about the shaft 46. The vertical shaft 70 connects into the temperature compensating mechanism 14 to affect the corrected volume measured by the meter in a manner well known in the art. In the preferred embodiment, the motion of the thermal actuator 12 is linear and produces a corresponding clockwise or counterclockwise arcuate travel of the respective arms 44 and 64 to result in a linear motion of any component (not shown) connected to the shaft 70, as the same is pivoted about the axis of the shaft 64. Depending upon the particular type of compensator used, the motion of the linkage assembly transmitted to such a compensator, could be either linear or arcuate as desired.

The casing 32 of the thermal actuator 12 serves as a temperature well in that it is inserted within the main gas stream of the chamber 30, as illustrated in FIGS. 1 and 3. The casing 32 includes a hollow upper section 76 which at its lower end telescopes into the upper end of a hollow lower section 78. Except for the telescoping portion of the upper section 76, the diameters of sections 76 and 78 are substantially equal. A bellows 80 is connected to the interior of the lower portion of the upper section 76 to extend downwardly within the lower section 78. The diameter of the bellows 80 is less than that of the lower section 78, whereby there will be a slight clearance between the inner surface of the lower section 78 and the outermost circumference of the bellows 80 to permit free movement of said bellows therein. The upper section 76, the lower section 78, and the bellows 80 are connected as by welding or soldering to form a hermetically sealed chamber 82 in the lower section 78. A sealed filling tube 84 extends downwardly a short distance from the bottom wall of the lower section 78. The top of the upper section 76 is open and terminates at the base of an enlarged vertical opening 86, shown in FIG. 1, formed in the end bell 36 to communicate with the space enclosed by the cover 40. The cover 40 is substantially circular with a projection 88 on one side which encloses the end of the actuator linkage assembly adjacent the opening 86. An actuated rod 90 is connected for friction-free movement between the bellows 80 and the biasing arm 44.

The chamber 82 is filled with a thermally expansible liquid 92 which will change volume responsive to the temperature fluctuation of the gas throughput flow in the meter 10, so as to cause the actuator rod 90 to move upwardly or downwardly in direct proportion to the temperature change of said gas.

The actuator rod 90 as illustrated in FIG. 3, has a body portion 94 threaded at its upper end to which is connected a head 96 having a cone-shaped tip 98 terminating in a point 100. The point 100 is received in a cone-shaped socket 102 having an apex angle which is larger than the apex angle of the cone 98 of the head 96, whereby point contact will be maintained by the point 100 nesting in the apex of the cone socket 102. The arm 104 as seen in FIG. 5 is biased by the spring 72 in the downward direction or toward the actuator rod 90, so as to maintain continuous contact therewith. The biasing force of the spring 72 is substantially constant, and has been designed into the system whereby it will not adversely affect the temperature compensator or the temperature changes signaled by the thermal actuator 12.

The lower portion 104 of the actuator 90 is of reduced diameter from that of the body portion 94 and terminates in a ball 106 which nests in a ball-shaped socket 108 formed in the bottom wall 110 of the bellows 80. The ball 106 makes a substantial point contact within the socket 108. Since there is a slight downwardly biasing force applied to the actuator rod 90, the bellows 80 will be urged downwardly into the chamber 82 to reach an equilibrium position with respect to the liquid 92 therein. The equilibrium position will shift corresponding to changes in the temperature of the liquid 92 as the same expands and contracts due to changes in the gas throughput temperature. Since the ball 106 and the tip 100 of the actuator rod 90 each make point contact with the respective connecting sockets 108 and 102, any movement of the actuator rod 90 will be substantially friction-free. Also, by connecting the actuator rod 90 in point contact with the bellows 80 and the actuator linkage assembly 42, it is possible to substantially eliminate backlash on the actuator rod 90 and thus prevent torque from being transmitted to the bellows 80.

One type of thermally expansible liquid 92 is a mixture of glycerine and water in a ratio of 67:33 by weight. Temperature changes in the liquid 92 will cause the liquid to expand or contract in a predictable fashion. Changes in volume of the thermally expansible liquid 92 are directly proportional to the temperature changes of the throughput gas in the meter 10, and will cause the bellows 80 and the actuator rod 90 to move correspondingly upwardly or downwardly responsive thereto. In this respect, the actuator rod 90 serves as an output shaft so as to shift the actuator linkage assembly 42 and cause the temperature compensating mechanism 14 to indicate the corrected count of the volume in register 22. This compensation in the volume of the gas throughput flow in meter 10 is necessary because the gas is normally sold in units of standard volume. In this application, the term "throughput flow" shall mean the following: the amount of fluid being put through the meter 10 and measured thereby. The device is designed to compensate for gas temperatures ranging from −20° to + 140° F. Since the thermal actuator 12 is completely enclosed within the meter 10, and the casing 32 is inserted within the chamber 30 of the cylindrical portion 28 all the temperature measurements are made responsive to the temperature of the gas throughput in the meter 10 and the ambient temperature changes will have no effect on such temperature measurements. Accordingly, the improved thermal actuator 12 provides a temperature sensitive hermetically sealed chamber responsive to the gas temperature without introducing ambient temperature errors; uses a liquid motive force in the liquid 12 which is a strong acting system as compared with the motive force of the bimetallic system, without the normal drawbacks of prior art liquid filled systems, and includes an actuator rod which is mounted for friction-free movement therein.

In the modified form of the invention as shown in FIG. 6, the lower section 104 may be fitted with a cone-shaped tip 120 which nests within a cone-shaped socket or recess 122 of a bottom wall 124 of the bellows 80a. The cone-shaped tip 120 will make point contact within the cone-shaped socket 122 and in all other respects the thermal actuator will have the same structure and operational features as that described hereinbefore. Except as specifically identified, the remainder of the components and reference characters will be identical with that of the preferred embodiment and will operate substantially similar thereto. In other words, except for replacing the ball 106 with the tip 120 and the bottom wall 110 with the bottom wall 124, respectively, the remainder of the embodiment will be substantially similar to that of the preferred form described hereinbefore.

It will be understood that various changes in the details, materials, arrangements of parts, and operating conditions which have been herein described and illustrated in order to explain the nature of the invention, may be made by those skilled in the art within the principles and scope of the invention.

Having thus set forth the nature of the invention, what is claimed herein is:

1. A thermal actuator assembly operatively associated with a temperature compensating mechanism for measuring the throughput flow of a meter comprising:
   a. a casing mounted in the meter in the path of the throughput flow therein,
   b. a bellows connected in the casing to form a sealed chamber therein,
   c. the bellows having a bottom wall,
   d. a thermally expansible liquid filling the chamber of the casing and adapted to position the bellows responsive to the temperature of said flow,
   e. an actuator rod disposed within the bellows to have one end make point contact with the bottom wall of the bellows,
   f. a plate member operatively connected to the temperature compensating mechanism, and to make point contact with the other end of the actuator rod,
   g. a resilient means disposed externally of the actuator assembly and connected within the meter to urge the plate member in the direction of the actuator rod, and
   h. the actuator rod to shift the plate member responsive to movement of the bellows due to temperature changes in said flow, whereby the motion of the actuator rod between the bellows and the plate is substantially friction-free since only point contact is maintained therebetween.

2. The combination claimed in claim 1 wherein:
   a. each end of the actuator rod is cone-shaped with the points thereof extending in a direction away from each other,
   b. a cone-shaped recess formed in said plate member with a larger tapered opening angle than the corresponding pointed end of the actuator rod to insure friction-free point contact therebetween, and
   c. a cone-shaped recess formed in the bottom of the bellows with a larger tapered opening angle than the corresponding pointed end of the actuator rod to insure friction-free point contact therebetween.

3. The combination claimed in claim 1 wherein:
   a. the biased plate member and the bottom of the bellows defining a pair of support members for carrying the actuator rod,
   b. a cone-shaped socket formed in one of the support members,
   c. a ball-shaped socket formed in the other of the support members,
   d. one end of the actuator rod having a cone-shape for point contact in said cone-shaped socket, and
   e. the other end of the actuator rod having a ball shape for point contact in the ball-shaped socket whereby the actuator rod transmits the motion of the bellows to said plate member in a friction-free manner.

4. The combination claimed in claim 3 wherein:
   a. the cone-shaped socket is formed in said plate member,
   b. the ball-shaped socket is formed in the bottom of the bellows, and
   c. the actuator rod has the cone-shaped end disposed in the cone-shaped socket and the ball-shaped end disposed in the ball-shaped socket.

5. A thermal actuator operatively associated with a spring-loaded temperature compensating device for measuring the throughput flow of a meter, said actuator comprising:
   a. a casing mounted in the meter,
   b. the casing having a hollow upper section and a hollow lower section,
   c. the upper section is open at the top and bottom thereof,
   d. the lower section is open at the top and closed at the bottom thereof,
   e. the bottom of the upper section is fixedly connected to the top of the lower section to define a one piece casing,
   f. a bellows having an open top and closed bottom is sealingly connected to the casing with the open top of the bellows disposed adjacent the connection of the upper and lower sections of the casing,
   g. the bellows extends into the lower section of the casing with the closed bottom thereof in spaced relation with the closed bottom of the lower section,
   h. the bellows of smaller cross-sectional area than the cross-sectional area of the lower section of the casing to permit the bellows to extend downwardly and move freely therein,
   i. a sealed chamber means formed in the lower section of the casing between the bellows and said lower section,
   j. a thermally expansible liquid filling the sealed chamber means,
   k. the lower section, including the sealed chamber means, exposed to the throughput flow of the meter whereby the thermally expansible liquid will expand and retract responsive to the temperature of said flow,
   l. an actuator rod having a lower end thereof making point contact with the bottom of the bellows, and
   m. the actuator rod extends upwardly through and out of the bellows and the upper section of the casing to have the upper end thereof come into point contact with said spring-loaded temperature compensating device, whereby the actuator rod is supported between said device and said bellows and will transmit the changes in the bellows position due to temperature variations of said flow to said temperature compensating device in a friction-free manner.

* * * * *